No. 759,374. Patented May 10, 1904.

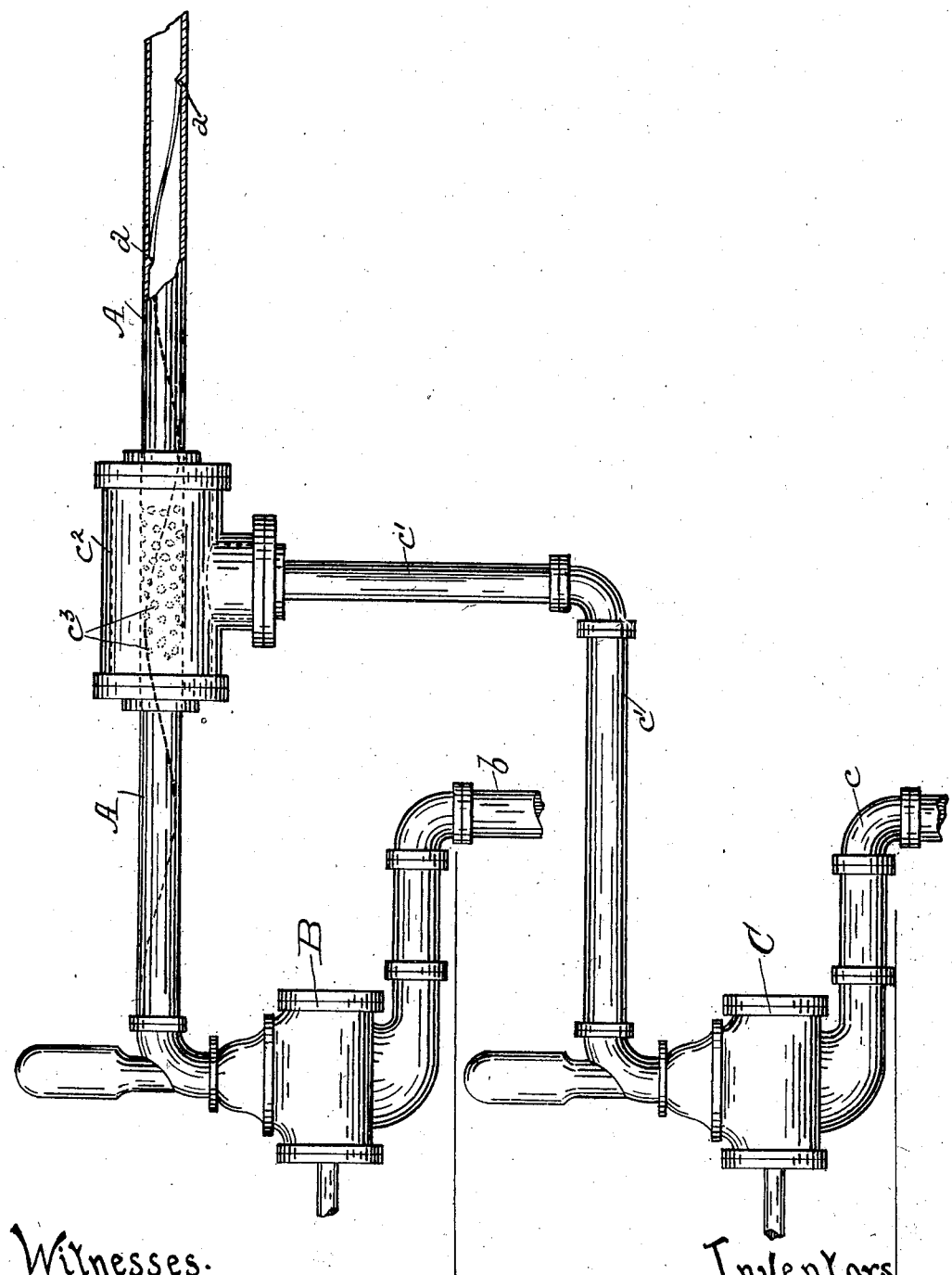

UNITED STATES PATENT OFFICE.

JOHN DOVE ISAACS, OF OAKLAND, AND JAMES BUCKNER SPEED, OF BERKELEY, CALIFORNIA.

METHOD OF PIPING FLUIDS.

SPECIFICATION forming part of Letters Patent No. 759,374, dated May 10, 1904.

Application filed January 11, 1904. Serial No. 188,484. (No specimens.)

*To all whom it may concern:*

Be it known that we, JOHN DOVE ISAACS, residing at Oakland, and JAMES BUCKNER SPEED, residing at Berkeley, Alameda county, State of California, citizens of the United States, have invented an Improvement in Methods of Piping Fluids; and we hereby declare the following to be a full, clear, and exact description of the same.

Our invention relates to the conveyance of fluids through pipes, and while said invention is applicable to the piping of any fluid in which the reduction of friction is desirable it is especially intended for the piping of oil.

The object of our invention is to reduce the friction of the moving fluid against the pipe-walls, which object is attained by the intervention between the fluid being conveyed and the pipe-walls of an envelop composed of a second fluid, between which second fluid and the pipe-walls the friction is less than that between said first fluid and the pipe-walls, or between which second fluid and the first fluid the friction is less than that between the said first fluid and the pipe-walls.

To reach this end, our invention consists in delivering to the pipe the fluid to be conveyed, together with a fluid of greater specific gravity, and in causing said fluids to advance through the pipe with a helical motion about the axis of the fluid content, whereby the denser fluid is caused to separate from the lighter and to incase it, thus reducing the frictional resistance to the flow of said lighter fluid.

In the accompanying drawing (the figure in which is an elevation of assembled parts, the pipe being partly in section) we show one form of an apparatus in which our method or improvement may be carried out, though it is to be understood that we do not confine ourselves to such apparatus, it being merely an illustration sufficient to make our improvement clear.

In the drawing, A represents a pipe-line through which the fluid desired to be conveyed is caused to flow. The flow may be occasioned by any suitable means—as, for example, the pump B, which draws said fluid by a suction-pipe $b$ from a suitable source. With the said first fluid is delivered to the pipe-line A a second fluid, which must be of greater specific gravity than the first fluid. The delivery may be effected at any suitable point and in any suitable manner. For example, it may be delivered with the first fluid to the pipe-line, or the first fluid may be introduced to the second in the pipe-line, or, as here indicated, the second fluid may be delivered to the first in the pipe-line, as by means of the pump C, with its suction $c$, delivery-pipe $c'$, encircling sleeve $c^2$, and holes $c^3$ in the pipe-line A. Now, as will be seen from the sectional part of the pipe-line A, the interior of said pipe is formed or provided with obstructions $a$, disposed in a helical course. These obstructions may be of any suitable nature—such as grooves, ribs, flanges, or other barriers—and they may be continuous or broken into separate parts, provided their disposition be in a helical course, and said obstructions are intended simply to illustrate and to stand for one form or means of effecting a helical motion of the fluid content as it advances through the pipe. It will now be seen that as said fluid content flows through the pipe it will have imparted to it a helical motion about its axis, which will have the effect of separating the denser fluid from the lighter, causing the former to form around and incase the latter and to intervene between the lighter fluid and the pipe-walls, thereby reducing the friction which would otherwise exist between said pipe-walls and the lighter fluid. In the application of our method or improvement to the piping of oil it will be readily understood that this advantage will be marked if, as will be the case in practice, the heavier fluid be water. In such case we have found that the proportion of the oil and water is between wide limits immaterial as to the character of the result and bearing only on the degree of the reduction of the friction to pumping; but there must be sufficient velocity of rotation before the envelopment of the lighter by the heavier fluid occurs, which velocity is dependent on the diameter of the pipe and the relative densities of the two fluids.

The pumping of gummy or viscous liquids through pipe-lines, notably heavy crude petroleum, which is often found as a fluid of a viscous, gummy, sticky, and ropy nature, presents a proper case for the exercise of our method. These characteristics of this fluid render its pumping through long pipe-lines, as now practiced, a very expensive operation, requiring many times as great a pressure to force a given quantity of oil as would be required for pure water. Our process affords a means of delivering the same quantity of oil with pressure about double that required for pumping pure water, and hence far smaller than required for oil under the ordinary methods. By our method, owing to the comparatively slow rotation required to produce the enveloping effect of the water, (it being found that quite a slow or gentle helical obstruction is sufficient,) the loss of energy expended in producing this rotation is so small in comparison with the loss by friction due to the present method of pumping through pipes as to be of little importance in view of the commercial desirability of such pumping.

Having thus described our invention, what we claim as new, and desire to secure by Letters Patent, is—

1. The method of piping a fluid which consists in advancing the fluid, together with a second fluid of greater specific gravity, through the pipe, with a helical motion about the axis of the fluid content, sufficient to envelop the lighter fluid with the heavier fluid.

2. The method of piping a fluid which consists in delivering said fluid to the pipe, together with a fluid of greater specific gravity, and in causing the fluid content to advance through the pipe with a helical motion about its axis sufficient to envelop the lighter fluid with the heavier fluid.

3. The method of piping oil which consists in advancing the oil, together with a fluid of greater specific gravity, through the pipe, with a helical motion about the axis of the fluid content sufficient to envelop the lighter fluid with the heavier fluid.

4. The method of piping oil which consists in delivering the oil to the pipe, together with a fluid of greater specific gravity, and in causing the fluid content to advance through the pipe, with a helical motion about its axis sufficient to envelop the lighter fluid with the heavier fluid.

5. The method of piping oil which consists in advancing the oil, together with water, through the pipe, with a helical motion about the axis of the fluid content sufficient to envelop the lighter fluid with the heavier fluid.

6. The method of piping oil which consists in delivering the oil to the pipe, together with water, and in causing the fluid content to advance through the pipe with a helical motion about its axis sufficient to envelop the lighter fluid with the heavier fluid.

In witness whereof we have hereunto set our hands.

JOHN DOVE ISAACS.
JAMES BUCKNER SPEED.

Witnesses:
  WALTER F. VANE,
  D. B. RICHARDS.